US012771214B2

(12) United States Patent
Fischinger et al.

(10) Patent No.: US 12,771,214 B2
(45) Date of Patent: Oct. 20, 2026

(54) MOTOR DEVICE WITH THERMALLY INTEGRATED SERVO DRIVE UNIT

(71) Applicant: Synapticon GmbH, Schönaich (DE)

(72) Inventors: Simon Fischinger, Schönaich (DE); Andrija Feher, Schönaich (DE); Nathanael Peltzer, Schönaich (DE); Florian Kock, Schönaich (DE)

(73) Assignee: Synapticon GmbH, Schönaich (DE)

( * ) Notice: Subject to any disclaimer, the term of this patent is extended or adjusted under 35 U.S.C. 154(b) by 147 days.

(21) Appl. No.: 18/690,711

(22) PCT Filed: Sep. 12, 2022

(86) PCT No.: PCT/IB2022/058562
§ 371 (c)(1),
(2) Date: Mar. 8, 2024

(87) PCT Pub. No.: WO2023/042055
PCT Pub. Date: Mar. 23, 2023

(65) Prior Publication Data

US 2024/0388173 A1 Nov. 21, 2024

(30) Foreign Application Priority Data

Sep. 16, 2021 (DE) ..................... 10 2021 123 971.0

(51) Int. Cl.
*H02K 11/33* (2016.01)
*H02K 5/08* (2006.01)
*H02K 11/21* (2016.01)

(52) U.S. Cl.
CPC ............... *H02K 11/33* (2016.01); *H02K 5/08* (2013.01); *H02K 11/21* (2016.01); *H02K 2211/03* (2013.01); *H02K 2213/03* (2013.01)

(58) Field of Classification Search
CPC ........ H02K 11/30; H02K 11/33; H02K 11/21; H02K 11/215; H02K 5/08; H02K 2213/03; H02K 2211/03
(Continued)

(56) References Cited

U.S. PATENT DOCUMENTS 10,236,750 B2 3/2019 Hirotani et al.
2008/0084141 A1 4/2008 Schueren
(Continued)

FOREIGN PATENT DOCUMENTS

CN 110829105 A 2/2020
CN 211018563 U 7/2020
(Continued)

OTHER PUBLICATIONS

German Application No. 10 2021 123 968.0, Search Report mailed Jun. 27, 2022, 8 pages.
(Continued)

*Primary Examiner* — Alexander A Singh
(74) *Attorney, Agent, or Firm* — Conley Rose, P.C.

(57) ABSTRACT

The disclosure relates to an integrated motor device with a motor unit and a servo drive unit attached to the motor unit, where the servo drive unit comprises a first printed circuit board with one or more power converting inverter elements; where the servo drive unit comprises at least an encoder read head of an encoder system configured for providing information on a position of a motor shaft of the motor unit; and the first printed circuit board is closer to a body of the motor unit than the encoder read head so as to reduce or overcome the problem of thermal derating in the integrated motor device.

20 Claims, 3 Drawing Sheets

(58) Field of Classification Search
USPC .............................................. 310/68 B, 68 R
See application file for complete search history.

(56) References Cited

U.S. PATENT DOCUMENTS

| | | | | |
|---|---|---|---|---|
| 2011/0254387 | A1* | 10/2011 | Matsuda | B62D 5/0406 310/43 |
| 2012/0229005 | A1 | 9/2012 | Tominaga et al. | |
| 2012/0286604 | A1 | 11/2012 | Abe et al. | |
| 2012/0286605 | A1 | 11/2012 | Miyachi et al. | |
| 2013/0099609 | A1 | 4/2013 | Ikeno et al. | |
| 2013/0099611 | A1 | 4/2013 | Suga et al. | |
| 2014/0091683 | A1 | 4/2014 | Ito et al. | |
| 2015/0171709 | A1 | 6/2015 | Ito et al. | |
| 2015/0222156 | A1 | 8/2015 | Tomizawa et al. | |
| 2016/0134178 | A1 | 5/2016 | Acinas Lope et al. | |
| 2017/0008554 | A1* | 1/2017 | Hirotani | B62D 5/0406 |
| 2017/0349206 | A1* | 12/2017 | Asao | H02K 5/225 |
| 2018/0131123 | A1 | 5/2018 | Kondo | |
| 2018/0219450 | A1 | 8/2018 | Yamamoto | |
| 2020/0079420 | A1 | 3/2020 | Takada | |
| 2021/0036453 | A1 | 2/2021 | Cayzac | |
| 2021/0175781 | A1 | 6/2021 | Furukawa et al. | |

FOREIGN PATENT DOCUMENTS

| | | | |
|---|---|---|---|
| DE | 102018201331 | A1 | 8/2018 |
| EP | 3220521 | A1 | 9/2017 |
| EP | 3297140 | A1 | 3/2018 |
| EP | 3508398 | A1 | 7/2019 |
| EP | 3772140 | A1 | 2/2021 |
| JP | 2013090532 | A | 5/2013 |
| JP | 2014075866 | A | 4/2014 |
| JP | 2017163810 | A | 9/2017 |
| JP | 2018078022 | A | 5/2018 |
| JP | 2020145849 | A | 9/2020 |
| WO | 2012025421 | A1 | 3/2012 |
| WO | 2014033833 | A1 | 3/2014 |

OTHER PUBLICATIONS

International Application No. PCT/IB2022/058561, International Search Report and Written Opinion mailed Dec. 15, 2022, 3 pages.
German Application No. 10 2021 123 971.0, Search Report mailed Jun. 27, 2022, 8 pages.
International Application No. PCT/IB2022/058562, International Search Report and Written Opinion mailed Jan. 3, 2023, 3 pages.
U.S. Appl. No. 18/690,709, Office Action mailed Nov. 26, 2025, 16 pages.
Japanese Application No. 2024-515580, Notice of Reasons for Rejection mailed May 26, 2026, 6 pages.
Japanese Application No. 2024-515619, Notice of Reasons for Rejection mailed May 26, 2026, 5 pages.

* cited by examiner

MOTOR DEVICE WITH THERMALLY INTEGRATED SERVO DRIVE UNIT

CROSS-REFERENCE TO RELATED APPLICATIONS

This application is a national stage filing of International Application No. PCT/IB2022/058562, filed Sep. 12, 2022, which claims priority to German Application No. 10 2021 123 971.0 filed Sep. 16, 2021. The entire disclosures of the afore-mentioned patent applications are incorporated herein by reference.

INTRODUCTION

The disclosure relates to a motor device with a motor unit and a servo drive unit attached to the motor unit, where the servo drive unit comprises a first printed circuit board with one or more power converting inverter elements.

Integrated motor devices, which are also referred to as inverter motors or integrated motors, that is, motors with integrated inverter and integrated control electronics, typically suffer from what is referred to as "thermal derating". This means that the maximum allowable continuous current, torque, and power are lower than those of the same base motor without integrated inverter, that is the motor unit without the servo drive unit. Thermal derating in fact reduces maximum allowable continuous current, torque, and power by about 30 to 40% as compared to the base motor as such.

This is due to the fact that the electronic control elements that are used in the servo drive unit of the integrated motor device typically allow lower operating temperatures than the motor unit itself. Namely, the maximum motor winding temperatures, and thus the maximal allowable temperature of the motor unit, is often in the range of 130 to 155° C. The switching elements' junction temperatures, that is the maximal allowable temperatures of the power converting inverter elements in the servo drive unit are in many cases about 150° C. However, the elements of the logic electronics, that is the electronic control elements of the servo drive unit are often rated for junction temperature of 125° C. or even lower temperatures.

In addition, the thermal power that needs to be dissipated from said heat sources, in particular the inverter elements which usually comprise high-power metal-oxide-semiconductor field-effect transistors, MOS-FETs, is significant and has to be transported along a well-defined thermal path to the ambient. Such a well-defined thermal path can be regarded as a network or series of thermal resistances. The lower these resistances are, the more heat can be dissipated, and thus more power, torque, and current can be converted in the motor device.

In order to keep the overall thermal resistances low, several strategies have been applied in the state-of-the-art. Firstly, large outer surface areas are used for the respective housings to decrease the thermal resistance of the convection of heat into the ambience. Therefore, the servo drive unit has, in many cases, a larger cross-section than the motor unit. Secondly, motor unit and servo drive unit are thermally isolated with respect to each other, leading to the motor unit operating at a higher temperature than the servo drive unit. Thirdly, the servo drive unit is divided into two thermally isolated sections, a first inverter section and a second logic/control section, where the operating temperature of the inverter section is higher than that of the control section.

All these strategies, however, do not make it possible to operate the motor unit at the base motor's thermal limit. If, in such a setting, the motor unit would be driven at the thermal limit of the base motor, the temperature difference between the power converting inverter elements on the one hand side and the motor windings on the other hand side would not be enough to transfer a sufficient amount of heat from the power converting inverter elements to the motor unit for dissipation, or even would result in a heat transfer in the wrong direction, thus additionally heating up the inverter elements. At the same time, the surface of the servo drive unit housing wouldn't be large enough to dissipate sufficient heat directly to the ambient in order to avoid overheating the power converting inverter elements.

All this is particularly true for integrated motor devices with comparatively high rated current, for instance, more than effective 10 A (10 $A_{rms}$), more than effective 20 A or more than effective 30 A of continuous phase current, with a low voltage direct current (DC) supply with maximally 120V. This results in maximum continuous powers between 400 W and 10 kW.

Consequently, such low-voltage DC-supply integrated motor devices are available only with a significant derating as compared to the corresponding base motors.

In addition, an integrated or inverter motor device typically contains a feedback system, that is, an encoder system configured for providing information on the position of a motor shaft of the motor, that is, an angle of the motor shaft. The encoder system needs to sense the rotor of the motor, and thus is mounted to the motor unit directly, or thus is the element of the servo drive unit that is closest to the motor unit, as compared with other elements of the servo drive unit.

The typical encoder system is a dedicated unit. Usually, it is a completely closed unit combining a stator as part of a read head, rotor as a target, as well as a bearing in one housing or integrated structure. Alternatively, it comprises a separate printed circuit board with the read head, and a target that are mounted to the motor unit sequentially. In either case, the encoder system does not fulfil any additional functionality, that is, it only provides information on the position of the motor shaft and does not by itself drive or control the motor unit.

EP 31 83 800 B1 shows an integrated motor device with a motor unit and a servo drive unit attached to the motor unit, where the servo drive unit has two temperature zones: A hot zone close to the motor unit, and cooler temperature zone further apart from the motor unit. Within a central area of the hot zone, close to the motor shaft, there is a cooler central area which is shielded from the close-by hot zone by a radial heat shield. This cooler central area is where the encoder system is arranged.

The DE 10 2005 037 488 B4 shows a servo drive unit for an integrated motor device with an inverter part and a control part. Both parts are thermally decoupled from one another. Furthermore, the inverter part, has two heatsinks that can be coupled to each other mechanically.

EP 2 238 817 B1 describes an integrated motor device, where the servo drive unit features a folded printed circuit board, where low-loss elements are arranged close to an outer surface of the housing made from plastic, and high-power elements are cooled via a outer surface of the housing made from metal. Furthermore, the servo drive unit is thermally decoupled from the motor unit.

DE 10 2010 055 869 A1 describes an integrated motor device, where a first printed circuit board with control elements is arranged parallel to the motor shaft, and a second printed circuit board parallel to the motor shaft is arranged perpendicular to said first printed circuit board.

In all the proposed solutions, however, a large thermal derating remains. Furthermore, the housing of the servo drive unit, that is, the endcap that is added to the motor unit when making it an integrated motor device, is comparatively large. This is due to the function of the endcap as a heat sink for the electronic elements, that is, electronic control elements as well as power converting elements. So, the housing of the servo drive unit is designed to dissipate most of if not all the heat produced by the servo drive unit to the ambient. This, however, requires said large surface area. Actually, cooling fins are added to the housings of the servo drive units in the state-of-the-art to increase heat dissipation. This, however, leads to hygiene problems in certain environments and applications, for instance, the food industry.

The technical problem to be solved can therefore be considered to reduce or overcome the problem of thermal derating in integrated motor devices.

This problem is solved by the subject matter of the independent claim. Advantages and advantageous embodiments are apparent from the dependent claims, the description, and the figures.

DESCRIPTION

One aspect relates to a motor device, an integrated motor device or inverter motor device, with a motor unit and a servo drive unit attached to the motor unit. Motor unit and servo drive unit have respective single housings and consequently are self-contained units. Thus, the motor unit is mechanically functional as a separate unit, as is the servo drive unit. The servo drive unit comprises a first printed circuit board, PCB, with one or more power converting inverter elements, the power electronics. The servo drive unit comprises at least an encoder read head of an encoder system configured for providing information on a position of a motor shaft of the motor unit. The corresponding encoder target of the encoder system can be part of the motor unit. In this case, when the servo drive unit is removed from the motor unit, the encoder target remains with the motor unit and the encoder read head is removed with the servo drive unit. Furthermore, the first printed circuit board is closer to a body of the motor unit than the encoder read head. So, the first printed circuit board is arranged, in an axial direction determined by the motor shaft, with a smaller distance from the body of the motor unit than the encoder read head. The first printed circuit board is thus arranged between the first plane running through the encoder read head and a second plane running through the body of the motor unit, in particular through the center-of-gravity of the motor unit. The first printed circuit board may be arranged essentially perpendicular to the rotation axis of the motor unit, thus, perpendicular or perpendicular with a given deviation. The deviation may be given as maximally 15°, maximally 5°, or maximally 2°. The motor device may be a motor device configured for an intended use with a direct current (DC) supply voltage of 120V or below, preferably with maximal continuous motor phase currents above 10 A. In particular, the motor device may be configured for continuous powers between 400 W and 10 kW.

This gives the advantage that most of the heat generated by the servo drive unit is generated very close to the motor unit, in particular very close to the body and housing of the motor unit, and at the same time the sensitive read head (and, as described below, electronic control elements) are further away from the hottest heat sources. By this arrangement, a design is made possible, where heat is transferred along a defined thermal path from the power electronics to body and housing of the motor unit. This is based on the insight that the surface area on the motor unit available for cooling is much larger than the surface area available on the servo drive unit. Thus, the housing of the motor unit can actually serve as a heat sink for the servo drive unit. As the thermal power of the motor unit is typically about seven times larger than the thermal power of the servo drive unit (e.g. 200 W to 30 W), the additional heat of the servo drive unit does not significantly influence the thermal design of the motor unit. As the encoder system, in particular, the encoder read head with the sensible electronics, is located in a plane that is more distant from the motor unit than the plane on which the power converting inverter elements are located, a reduced thermal resistance from the inverter elements to the motor unit is possible: For example by a large surface-area, direct thermal connection between the power electronics, that is, the first printed circuit board with the power converting inverter elements, and the motor unit, in particular, the body of the motor unit. Furthermore, the effect of this low-resistance thermal path can be improved by the power converting inverter elements, the switching elements, being specified for and operated at a junction temperature of more than 150° C., preferably more than 160° C., in some cases more than 170 degrees Celsius.

To foster the advantage of the last paragraph, motor unit and servo drive unit may be configured such that, at continuous nominal operation, an operating temperature of motor windings of the motor unit is below an operating temperature of the power converting inverter elements of the servo drive unit. In particular, the motor windings may be designed to reach an operating temperature of at least 120° C. but below 150° C. at continuous nominal operation of the motor device. In particular, the power converting inverter elements may be designed to reach an operating temperature between 150° C. and 200° C. at continuous nominal operation of the motor device.

Furthermore, the encoder read head is then located in the cooler area of the servo drive unit, that is not next to the motor or on the hot first printed circuit board. This arrangement of the encoder system, in particular, the encoder read head, results also in a better integration of the encoder system within the rest of the servo drive unit. Instead of being a dedicated device, which is essentially a closed unit installed somewhere in the servo drive unit or motor unit, respectively, the position reading functionality can now be integrated into an already existing other printed circuit board, for instance, a second printed circuit board which has one or more electronic control elements, that is, features functionalities like the control logic, the micro controllers, and functional safety components. This allows the combined usage of the voltage converters for both the electronic control elements and the encoder system. Also, the encoder system requires less signal processing and data encoding, as the position signals can be read directly by the microcontroller that executes the motor control algorithms arranged on the second printed circuit board. This saves space and simplifies the production.

The electronic components of the encoder system, in particular the encoder read head, can be mounted directly on said second printed circuit board, preferably by a soldered connection. Alternatively, they can be mounted on a small additional printed circuit board, an auxiliary printed circuit board that is soldered directly, preferably without cables or connectors, to the second printed circuit board. Such additional printed circuit board is usually referred to as "castellated printed circuit board". Thereby, i.e. by placing or not placing the castellated printed circuit board, by placing or not placing the encoder components, by having different variants of the castellated printed circuit board and using different signal processing algorithms, different variants of the encoder system can be implemented, which results in a modular encoder system. So, depending on the application at hand, different functionalities, such as the presence or absence of a multi-turn functionality, in particular of a Wiegand-type multiturn functionality and/or different accuracy classes of the encoder system and/or different levels of functional safety related to the encoder system can be implemented easily, as they rely only to the servo drive unit and, due to the arrangement of the encoder system in the cooler area of the servo drive unit, the boundary conditions are lax.

The main difference of the proposed solution is that the power converting inverter elements, the switching elements as core components of the inverter, are thermally and mechanically associated with the motor unit due to their proximity to the motor unit, and that the encoder system is thermally and mechanically associated with the cool part of the servo drive unit due to its distance from motor unit and inverter elements. In the known solutions, this is vice versa: The known encoder systems are independent systems belonging to the motor unit, while inverter elements and electronic control elements belong together as one unit, to the servo drive unit.

So, the inverter elements are cooled more effectively, as they can be cooled by the housing of the motor unit, and the motor unit can run hotter, as the sensitive electronic elements are further away from the motor unit as in known designs. This results in higher maximum continuous power, higher maximum continuous torque, and higher maximum continuous current. The overall high level of integration further simplifies the assembly and, as a smaller outer surface area is required for the servo drive unit than in the state-of-the-art, a more compact design is possible, which synergistically adds up with the improved thermal path.

An alternative solution would be to use a separate encoder system, which then should be flat and be able to operate under very high temperatures, which then could be mounted the classic way between the first printed circuit board and the motor unit, eventually directly on the monitor or sunk in the motor.

In a preferred embodiment, the first printed circuit board comprises a through-hole through which an encoder target of the encoder system is mechanically coupled with the motor shaft of the motor unit, in particular via an adapter element attached to the motor shaft and the encoder target or via the motor shaft itself. Consequently, the through-hole is a central through-hole. Thus, the encoder target may pass through or reach through the through-hole in order to have the encoder target close to the encoder read head, which is behind the first printed circuit board from a motor unit side perspective. Alternatively or in addition, the motor shaft and/or an adapter element may pass through or reach through the through-hole and the encoder target is completely arranged at a side of the first printed circuit board which is remote from the motor unit, its remote side. So, at least a surface used for optical and/or magnetic coupling of encoder read head and encoder target is arranged on the remote side of the first printed circuit board. Thus, the encoder target, at least said surface, may be considered arranged between the main extension plane of the first printed circuit board and the encoder read head while the first printed circuit board is still the part of the servo drive unit with the smallest distance from the body or housing of the motor unit (except eventually the housing of the servo unit itself, which may, as the first printed circuit board, be in contact with the motor unit and thus have distance zero). This gives the advantage that the entire encoder system is arranged on the level further away from the motor unit as compared to the first printed circuit board (which is the inverter printed circuit board).

In another advantageous embodiment, the one or more power converting inverter elements of the first printed circuit board are surface mounted elements, commonly also referred to as surface mounted devices, SMDs, with the surface mounted elements being mounted on a first surface of the first printed circuit board which is oriented away from the motor unit, i.e. towards the rest of the servo drive unit. So, the first surface is oriented towards the encoder read head or towards the inside of the servo drive unit, e.g. the second printed circuit board. This gives the advantage of a second surface of the first printed circuit board, which is orientated in the opposite direction, that is, towards the motor unit, to be flat and thus to easily form a large area ideal for transferring heat from the servo drive unit to the body of the motor unit.

Alternatively to or in addition to the power converting inverter elements of the first printed circuit board being surface mounted elements, at least some, i.e. some or all, of said power converting inverter elements may be elements integrated into the printed circuit board, that is into the built-up layers of the printed circuit board (PCB). This approach may also be referred to as "PCB embedding" of the power converting inverter elements. Such integrated elements are incorporated into the printed circuit board completely, i.e. they are not protruding from the surface of the printed circuit board, which can be achieved by specialized methods of production. This allows for highly compact electronic systems to be made. Components are embedded either in a single or into multiple layers of the PCB build-up with an optimized three-dimensional interconnection architecture. As a consequence, the power converting inverter elements can be placed closer to the body of the motor unit, with the corresponding surface of the first printed circuit board oriented towards the motor unit being flat which gives a large area ideal for transferring heat from the servo drive unit to the body of the motor unit.

Therein, the second surface preferably forms an outer surface of the servo drive unit. This gives the advantage that no part of the housing is arranged between the first printed circuit board and the body of the motor unit, which significantly enhances heat transfer to the motor unit.

In particular, the second surface is, at least in part, preferably for the most part, in planar contact with the body of the motor unit. This contact may be improved by materials like graphite, a thermal paste or other thermal interface materials applied on the body of the motor unit and or the second surface. However, at least in the area(s) of planar contact, the distance from first printed circuit board to the body, thus the motor unit, is essentially zero. This results in a particular efficient thermal coupling of the first printed circuit board and the body of the motor unit.

In another preferred embodiment, the first printed circuit board is an insulated metallic substrate board, IMS-PCB, with a metal layer forming the second surface. So, said metal part of the printed circuit board can be in direct planar contact with the motor surface over a large fraction of the motor unit's cross section most advantageously. This basically leads to an ideal heat transfer from first printed circuit board to the body of the motor unit.

In another advantageous embodiment, the one or more power converting inverter elements are arranged on the first printed circuit board such that their respective distances to an outer edge of the first printed circuit board are less than 25%, preferably less than 15%, most preferably less than 10% of the total extension of the first printed circuit board in the direction of the respective distance. So, the power electronics, in particular MOSFETs as inverter elements, are arranged close to the outer edge of the first printed circuit board. In this area, the pressure towards the motor unit is higher, which results in better heat conductivity, making the cooling by the motor housing more effective.

In another advantageous embodiment, the servo drive unit comprises a support element that is arranged on the first surface side of the first printed circuit board, in particular on the first surface of the first printed circuit board, and that exerts a force on the first printed circuit board in the axial direction of the motor unit towards the motor unit. So, the support element acts as a pressure plate that insurers that the first printed circuit board doesn't bend much, thereby improving thermal coupling, as described above. Consequently, the support element may be or comprise a plate with a main extension plane perpendicular to the axial direction, in particular with reinforcement ribs increasing stability in the axial direction. The support element may be configured to apply a pre-tension on the first printed circuit board when the servo drive unit is not yet attached to the motor unit. In particular such a pre-tension can be achieved by an increased thickness in a central area close to a central axis of the motor unit as compared to the thickness in an outer area close to the edge of the first printed circuit board. Therein, thickness is measured along the axial direction.

In another advantageous embodiment, an insulating element with a main extension plane perpendicular to the axial direction of the motor device is arranged between the first printed circuit board and the second printed circuit board of the servo drive unit, where the second printed circuit board has one or more electronic control elements, and, preferably, the encoder read head is mounted on the second printed circuit board (as described above). This gives the advantage of an even more developed thermal coupling of the first printed circuit board with the body of the motor unit. Furthermore, the insulating element may also be or comprise the support element and thus actively foster the heat transfer of the first printed circuit board to the body of the motor unit.

In an advantageous embodiment, the housing of the servo drive unit is closed on five sides, thus features five housing sides, and the insulating element thermally insulates the power converting inverter elements from the housing at each of the five sides, i.e. from the housing sides, to at least 80%, preferably to 100%. This can be achieved, for instance, by an arrangement of the power converting inverter elements on one side of the insulating element, and of the housing, at least in part, for instance the endcap of the housing, on the other side of the insulating element. The ratio of an 80%- or a 100%-insulation can be achieved by having for instance 80% or 100% of the housing arranged on said other side of the insulation element.

In yet another advantageous embodiment, an edge region of the second printed circuit board, the edge region being in mechanical contact with a housing of the servo drive unit, is made at least in part of a metal, preferably copper, for reducing thermal resistance between the second printed circuit board and the housing of the servo drive unit. This gives the advantage of a lowered temperature difference between the second printed circuit board and the housing of the servo drive unit, at least regarding the part of the housing of the servo drive unit the edge region is in mechanical contact with. Thus, an integrated thermal concept is realized, where the body or housing of the motor unit serves as a heatsink for the hot components, that is, motor windings and power electronics, and the housing of the servo drive unit serves as heatsink for the low-loss components such as electronic control elements and encoder read head.

Consequently, the insulating element may not only insulate the second printed circuit board from the first printed circuit board, but insulate a main part of the housing of the servo drive unit from both first printed circuit board and the body of the motor unit. The insulating element may thus itself form a minor part of the housing of the servo drive unit, such that the main part of the housing of the servo drive unit is not in mechanical contact with the housing of the motor unit. To this end, the insulating element may have a circumferential frame which in mechanical contact with the main part, the endcap, of the housing of the servo drive, and the housing of the motor unit. The frame is arranged between the housings of servo drive unit and motor unit, respectively. This further fosters the described advantageous thermal concept of the motor device.

The described features of the motor device, in particular thermal resistance between motor unit and servo drive unit and/or power of the power converting inverter elements of the servo drive unit and/or power of the motor unit, may be dimensioned such that at continuous nominal operation of the motor device, more than 50%, of the waste heat created in the power converting elements is dissipated to the motor unit, in particular the housing of the motor unit.

Another aspect relates to a servo drive unit for the motor device of any of the described embodiments.

Yet another aspect relates to a motor unit for the motor device of any of the described embodiments.

Advantages and advantageous embodiments of the servo drive unit and/or motor unit correspond to advantages and advantageous embodiments of the motor device.

The features and combinations of features described above, also in the introduction, as well as the features and combinations of features disclosed in the figure description or the figures alone may not only be used alone or in the described combination, but also with other features or without some of the disclosed features without leaving the scope of the invention. Consequently, embodiments that are not explicitly shown and described by the figures but that can be generated by separately combining the individual features disclosed in the figures are also part of the invention. Therefore, embodiments and combinations of features that do not comprise all features of an originally formulated independent claim are to be regarded as disclosed. Furthermore, embodiments and combinations of features that differ from or extend beyond the combinations of features described by the dependencies of the claims are to be regarded as disclosed.

DETAILED DESCRIPTION

Exemplary embodiments are further described in the following by means of schematic drawings. Therein, FIG. 1 shows a cross-section of an exemplary motor device with a motor unit and a servo drive unit attached to the motor unit;

In the different figures, identical or functionally identical features have the same reference signs.

Figure 1:
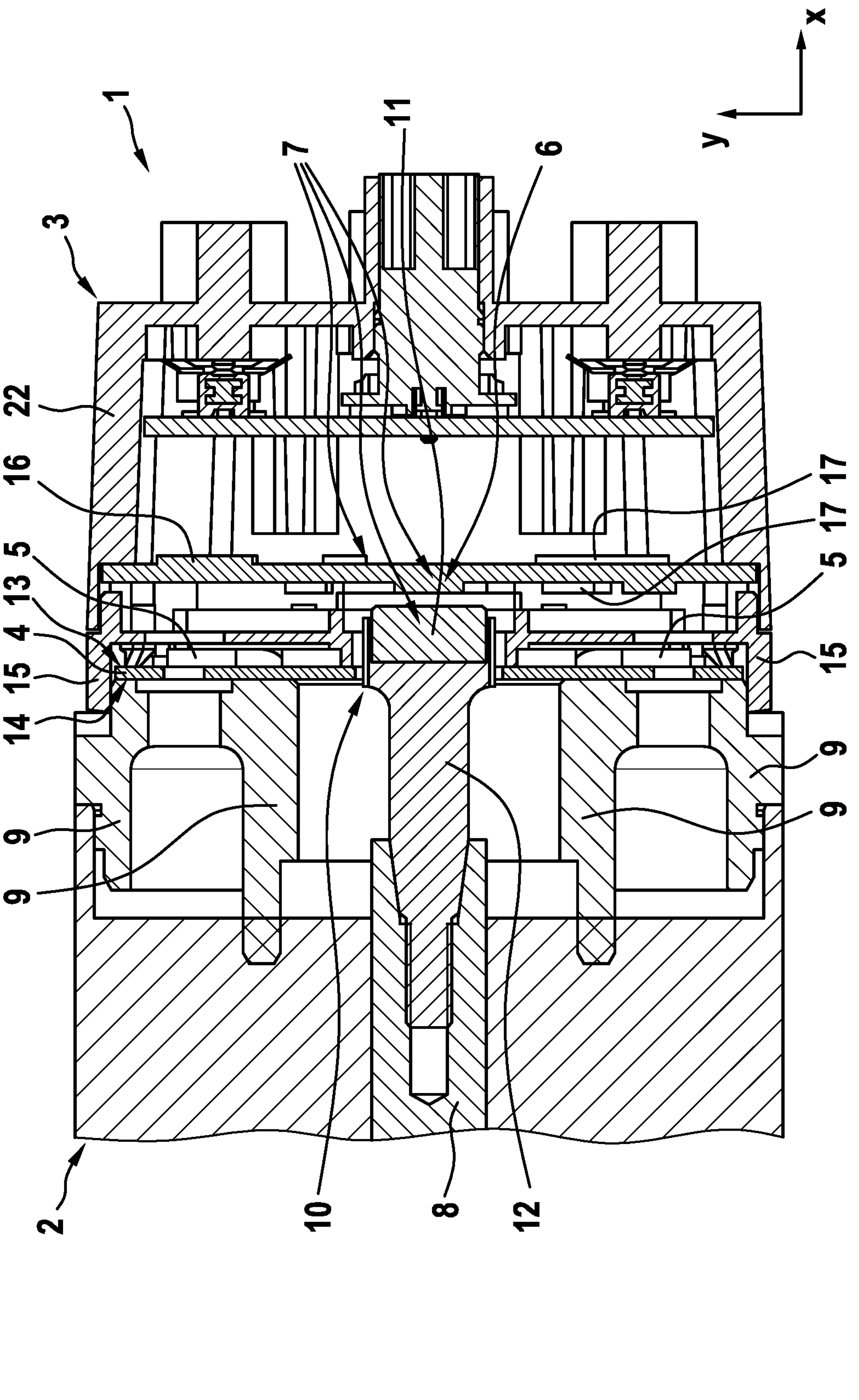

FIG. 1 shows a cross-section of an exemplary embodiment of an integrated motor device 1 with a motor unit 2, and a servo drive unit 3 attached to the motor unit 2, where the servo drive unit 3 comprises a first printed circuit board 4 with one or more power converting inverter elements 5. The servo drive unit 3 comprises at least an encoder read head 6 of an encoder system 7 configured for providing information on a position of a motor shaft 8 of the motor unit 2. The first printed circuit board 4 is closer to a body/housing 9 of the motor unit 2 than the encoder read head 6.

In the present embodiment, the first printed circuit board 4 comprises a through-hole 10 through which an encoder target 11 of the encoder system 7 is mechanically coupled with the motor shaft 8 of the motor unit 2. In the present example, this mechanic coupling is achieved by an adapter element 12 attached to the motor shaft 8 and the encoder target 11. Here, the power converting inverter elements 5 of the first printed circuit board 4 are all surface-mounted elements which are mounted on a first surface 13 of the first printed circuit board 4. This first surface 13 is orientated away from the motor unit 2, in a positive x-direction, such that it faces, in the present example, a second printed circuit board 16 of the servo drive unit 3.

In this example, most part of a second surface 14 of said first printed circuit board 4, which is the surface opposite to the first surface 13, is in planner contact with the body/housing 9 of the motor unit 2. Consequently, this second surface 14 is orientated towards the motor unit 2, in a negative x-direction. In the shown example, the first printed circuit board 4 is an integrated metallic substrate board, where the second surface 14 is formed by a corresponding metal layer.

In the shown example, the motor device 1 also comprises a combined insulating and support element 15 with a main extension plane in the z-y-plane, perpendicular to the axial x-direction, arranged between the first printed circuit board 4 and the second printed circuit board 16 of the servo drive unit 3, where the second printed circuit board 16 has one or more electronic control elements 17 and, in the present example, also the encoder read head 6 mounted thereon. The insulating element 15 also thermally decouples the body/housing 9 of motor unit 2 from an endcap 22, which, together with a frame 21 (FIG. 2) of the insulating element 15 in the present example, forms the housing of the servo drive unit 3.

The combined insulating and support element 15 is in contact with the first printed circuit board 4 and exerts a force on the first surface 13 of the first printed circuit board 4, which pushes the first printed circuit board 4 towards the motor unit 2 in the negative x-direction. The insulating and support element 15 is described in more detail in FIG. 4.

Figure 2:
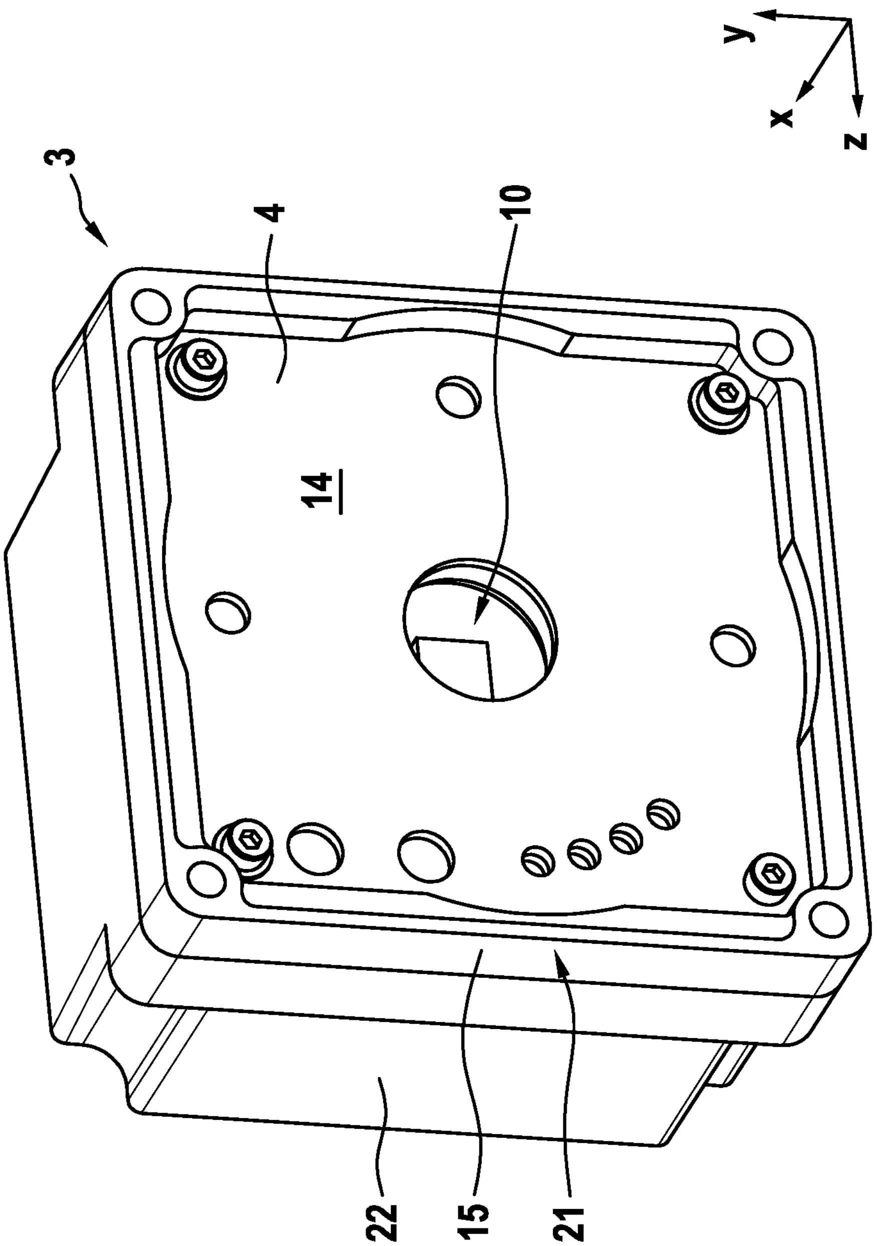
FIG. 2 shows a perspective view on the exemplary servo drive unit of FIG. 1.

FIG. 2 shows a perspective view on the servo drive unit 3 of FIG. 1 from the perspective of the motor unit 2. The second surface 14 is in fact a flat surface, which optimizes thermal coupling with the body/housing 9 of motor unit 2. Insulating part 15 forms a circumferential frame 21 for the housing of the servo drive unit 3 and thus isolates, as part of the housing of the servo drive unit 3, the endcap 22 as main part of the housing of the servo drive unit 3 from the body/housing 9 of the motor unit 2. Furthermore, the second surface 14 forms an outer surface of the servo drive unit 3 at a side of the servo drive unit 3, where no housing is provided by endcap 22 and insulating element 15, in the present example.

Figure 3:
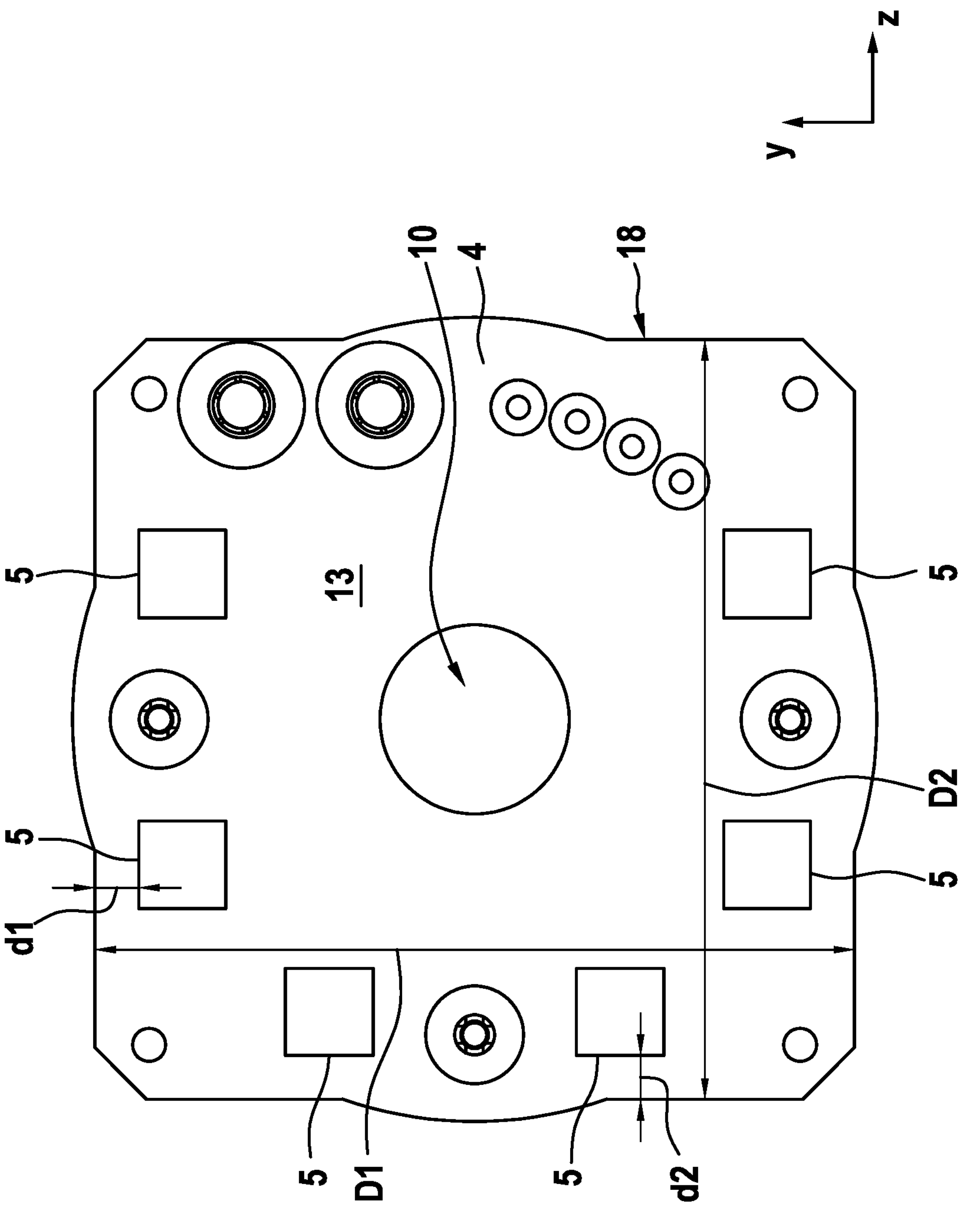
FIG. 3 shows a view on the exemplary first printed circuit board of FIG. 2.

FIG. 3 shows an exemplary embodiment of the first surface 13 of the first printed circuit board 4. There, the one or more power converting inverter elements 5 are arranged on the first printed circuit board 4 with their respective distances d1, d2 to an outer edge 18 of the first printed circuit board 4 being less than an exemplary 10% of the respective total extensions D1, D2 of the first printed circuit board 4 in the respective y-/z-direction corresponding to the respective distance d1, d2.

The invention claimed is:

1. A motor device with a motor unit and a servo drive unit attached to the motor unit, the motor unit and servo drive unit each with a respective single housing, where the servo drive unit comprises a first printed circuit board with one or more power converting inverter elements; characterized in that:

the servo drive unit comprises at least an encoder read head of an encoder system configured for providing information on a position of a motor shaft of the motor unit;

the first printed circuit board is closer to the housing of the motor unit than the encoder read head; and the one or more power converting inverter elements of the first printed circuit board are surface-mounted elements, with the surface-mounted elements being mounted on a first surface of the first printed circuit board which is oriented away from the motor unit.

2. The motor device of claim 1, characterized in that:

the first printed circuit board comprises a through-hole through which an encoder target of the encoder system is mechanically coupled with the motor shaft of the motor unit via an adapter element attached to the motor shaft and the encoder target or via the motor shaft itself.

3. The motor device of claim 1, characterized in that:

a second surface of the first printed circuit board, which is orientated towards the motor unit, forms an outer surface of the servo drive unit.

4. The motor device of claim 3, characterized in that:

the second surface is, at least in part, in planar contact with the housing of the motor unit.

5. The motor device of claim 3, characterized in that:

the second surface is, for the most part, in planar contact with the housing of the motor unit.

6. The motor device of claim 3, characterized in that:

the first printed circuit board is an insulated metallic substrate board, with a metal layer forming the second surface.

7. The motor device of claim 1, characterized in that:

the one or more power converting inverter elements are arranged on the first printed circuit board with their respective distances (d1, d2) to an edge of the first printed circuit board being less than 25% of the total extension (D1, D2) of the first printed circuit board in the direction (y, z) of the respective distances (d1, d2).

8. The motor device of claim 1, characterized in that:

the one or more power converting inverter elements are arranged on the first printed circuit board with their respective distances (d1, d2) to an edge of the first printed circuit board being less than 15% of the total extension (D1, D2) of the first printed circuit board in the direction (y, z) of the respective distances (d1, d2).

9. The motor device of claim 1, characterized in that:

the one or more power converting inverter elements are arranged on the first printed circuit board with their respective distances (d1, d2) to an edge of the first printed circuit board being less than 10% of the total extension (D1, D2) of the first printed circuit board in the direction (y, z) of the respective distances (d1, d2).

10. The motor device of claim 1, characterized in that: the servo drive unit comprises a support element that is arranged on the first surface of the first printed circuit board and that exerts a force on the first printed circuit board in an axial direction (−x) towards the motor unit.

11. The motor device of any claim 1, characterized in that: at continuous nominal operation of the motor device, more than 50% of the waste heat created in the power converting inverting elements is dissipated to the housing of the motor unit.

12. The motor device of claim 1, the first surface of the first printed circuit board is oriented towards the encoder read head.

13. A motor device with a motor unit and a servo drive unit attached to the motor unit, the motor unit and servo drive unit each with a respective single housing, where the servo drive unit comprises a first printed circuit board with one or more power converting inverter elements; characterized in that:

the servo drive unit comprises at least an encoder read head of an encoder system configured for providing information on a position of a motor shaft of the motor unit;

the first printed circuit board is closer to the housing of the motor unit than the encoder read head; and an insulating element with a main extension plane perpendicular to an axial direction (−x) determined by the motor shaft is arranged between the first printed circuit board and a second printed circuit board of the servo drive unit, where the second printed circuit board has one or more electronic control elements, and the encoder read head is mounted on the second printed circuit board.

14. The motor device of claim 13, characterized in that: the housing of the servo drive unit is closed on five sides, and the insulating element thermally insulates the power converting inverter elements from the housing at each of the five sides to at least 80%, preferably to 100%.

15. The motor device of claim 13, characterized in that: the housing of the servo drive unit is closed on five sides, and the insulating element thermally insulates the power converting inverter elements from the housing at each of the five sides to 100%.

16. The motor device of claim 13, characterized in that: an edge region of the second printed circuit board, the edge region being in mechanical contact with an endcap of the servo drive unit, is made at least in part of a metal, for reducing thermal resistance between the second printed circuit board and the housing of the servo drive unit.

17. The motor device of claim 13, characterized in that: an edge region of the second printed circuit board, the edge region being in mechanical contact with an endcap of the servo drive unit, is made at least in part of copper, for reducing thermal resistance between the second printed circuit board and the housing of the servo drive unit.

18. The motor device of claim 13, characterized in that: the encoder read head is arranged directly on the second printed circuit board of the servo drive unit by means of a soldered connection.

19. The motor device of claim 13, characterized in that: an edge region of the second printed circuit board, the edge region being in mechanical contact with an endcap of the servo drive unit, is made at least in part of a metal, for reducing thermal resistance between the second printed circuit board and the endcap of the servo drive unit.

20. A motor device with a motor unit and a servo drive unit attached to the motor unit, the motor unit and servo drive unit each with a respective single housing, where the servo drive unit comprises a first printed circuit board with one or more power converting inverter elements; characterized in that:

the servo drive unit comprises at least an encoder read head of an encoder system configured for providing information on a position of a motor shaft of the motor unit;

the first printed circuit board is closer to the housing of the motor unit than the encoder read head; and the motor unit and servo drive unit are configured such that, at continuous nominal operation, an operating temperature of motor windings of the motor unit is below an operating temperature of the power converting inverter elements of the servo drive unit.

* * * * *